US012315715B1

(12) United States Patent
Li

(10) Patent No.: US 12,315,715 B1
(45) Date of Patent: May 27, 2025

(54) LIGHT BULB

(71) Applicant: Shenzhen iLamp Technology Co.,LTD, Shenzhen (CN)

(72) Inventor: Yuanlong Li, Hunan (CN)

( * ) Notice: Subject to any disclaimer, the term of this patent is extended or adjusted under 35 U.S.C. 154(b) by 0 days.

(21) Appl. No.: 18/919,133

(22) Filed: Oct. 17, 2024

(30) Foreign Application Priority Data

Sep. 23, 2024 (CN) ........................ 202422322271.0

(51) Int. Cl.

| | |
|---|---|
| ***H01K 5/00*** | (2006.01) |
| ***H01K 1/22*** | (2006.01) |
| ***H01K 1/40*** | (2006.01) |
| ***H01K 1/62*** | (2006.01) |
| ***H01R 33/22*** | (2006.01) |

(52) U.S. Cl.
CPC ................ *H01K 5/00* (2013.01); *H01K 1/22* (2013.01); *H01K 1/40* (2013.01); *H01K 1/62* (2013.01); *H01R 33/22* (2013.01)

(58) Field of Classification Search
CPC .. H01K 5/00; H01K 1/22; H01K 1/40; H01K 1/62; H01R 33/22
USPC .......................................................... 313/578
See application file for complete search history.

(56) References Cited

U.S. PATENT DOCUMENTS 4,053,759 A * 10/1977 Wilkinson ............. G03B 21/20 362/218

* cited by examiner

*Primary Examiner* — James R Greece
*Assistant Examiner* — Hana S Featherly

(57) ABSTRACT

The present disclosure relates to a light bulb, including: an enclosure provided with a connection portion, the connection portion being provided with an opening in communication with an interior of the enclosure; a base connected to the connection portion of the enclosure, an inner side surface of the base being provided with a first conductive contact, and an inner end of the base away from the enclosure being provided with a second conductive contact; a light-emitting body including an alternating current filament, a first resistor, and a second resistor, the alternating current filament being configured to emit light and located in the enclosure; and a plug arranged at the opening, the plug being configured to block the opening.

8 Claims, 5 Drawing Sheets

LIGHT BULB

TECHNICAL FIELD

The present disclosure relates to the field of lights, and in particular to a light bulb.

BACKGROUND ART

Light bulbs are products that people need to use in their daily lives. With the development of society, there are more and more types of light bulbs, and people's demand for light bulbs is also increasing. An existing light bulb has two pins, which are configured to be connected to a power supply. In order to enable the two pins to be in contact with conductive contacts, the pins need to be bent for contact with the conductive contacts.

SUMMARY

The present disclosure provides a light bulb, the structure of which further facilitates improvement of the manufacturing efficiency of the light bulb.

A light bulb includes: an enclosure provided with a connection portion, the connection portion being provided with an opening in communication with an interior of the enclosure; a base connected to the connection portion of the enclosure, an inner side surface of the base being provided with a first conductive contact, and an inner end of the base away from the enclosure being provided with a second conductive contact; a light-emitting body including an alternating current filament, a first resistor, and a second resistor, the alternating current filament being configured to emit light and located in the enclosure; and a plug arranged at the opening, the plug being configured to block the opening, and including a first end surface close to the alternating current filament and a second end surface away from the alternating current filament, wherein the first resistor includes a first body, and a first wire and a first pin respectively connected to two ends of the first body; the second resistor includes a second body, and a second wire and a second pin respectively connected to two ends of the second body; the first body and the second body are arranged in the plug, and the first wire and the second wire pass through the first end surface and are respectively connected to two ends of the alternating current filament; the first wire and the second wire pass through the second end surface and are respectively in contact with the first conductive contact and the second conductive contact; and wherein the plug is provided with a first slot extending through the second end surface, and the first body is tightly fitted in the first slot, to limit displacement of the first body and facilitate bending of the first pin during processing such that the first pin is in contact with the first conductive contact.

Figure 1:
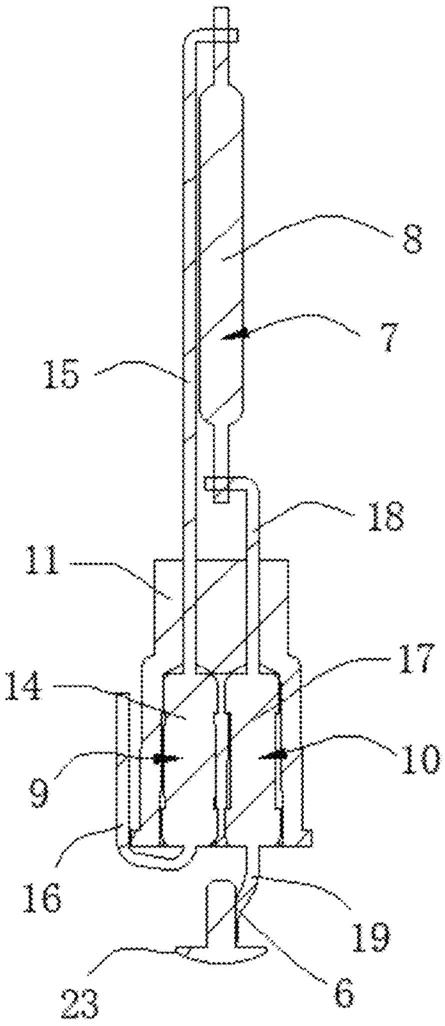
FIG. 1 is a schematic structural diagram of a partial structure of a light bulb according to an embodiment of the present disclosure.
Figure 2:
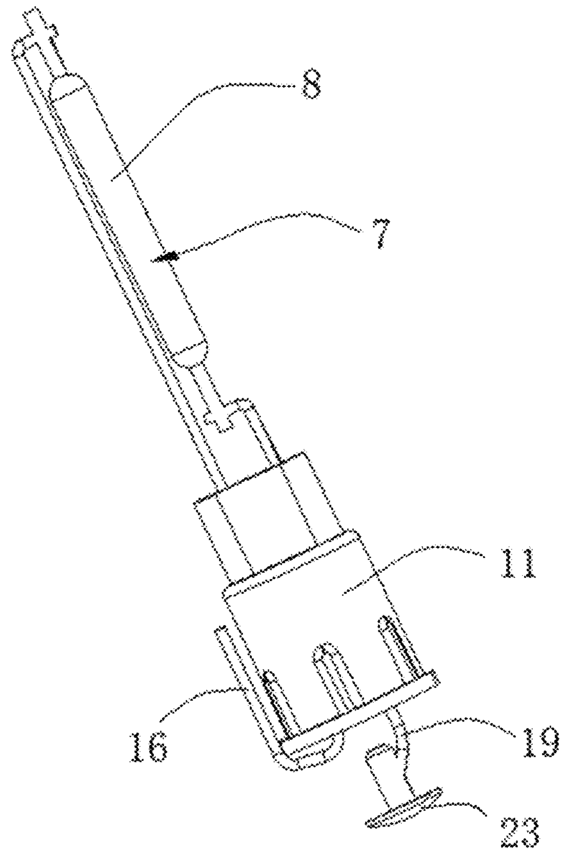
FIG. 2 is a perspective view of a partial structure of a light bulb according to an embodiment of the present disclosure.

List of reference signs: 1. enclosure; 2. connection portion; 3. opening; 4. base; 5. first conductive contact; 6. second conductive contact; 7. light-emitting body; 8. alternating current filament; 9. first resistor; 10. second resistor; 11. plug; 12. first end surface; 13. second end surface; 14. first body; 15. first wire; 16. first pin; 17. second body; 18. second wire; 19. second pin; 20. first slot; 21. second slot; 22. housing; 23. rivet; 24. mounting hole; 25. protrusion; 26. curved surface; 27. first guide surface; 28. first channel; 29. second guide surface; 30. second channel; 31. limiting portion; 32. extension portion.

DETAILED DESCRIPTION OF EMBODIMENTS

Specific embodiments of the present disclosure will be described in detail in this section. Preferred embodiments of the present disclosure are illustrated in the accompanying drawings. The accompanying drawings serve to supplement the text description of the specification with figures, providing a visual understanding of each technical feature and the overall technical solution of the present disclosure, but cannot be construed as a limitation to the scope of protection of the present disclosure.

In the description of the present disclosure, it should be understood that orientation or position relationships indicated by terms "upper", "lower", "front", "rear", "left", "right", etc. are orientation or position relationships as shown in the accompanying drawings, and these terms are just used to facilitate description of the present disclosure and simplify the description, rather than indicating or implying that the mentioned device or element must have a specific orientation and must be constructed and operated in a specific orientation, and thus cannot be construed as a limitation to the present disclosure.

In the description of the present disclosure, "several" means one or more, "a plurality of" means two or more, "greater than", "less than", "over", etc. are construed as excluding the number, and "above", "below", "within", etc. are construed as including the number. The terms "first" and "second" in the description are merely intended to distinguish technical features, and cannot be construed as indicating or implying relative importance or implicitly indicating the number of the indicated technical features or implicitly indicating a sequence relationship of the indicated technical features.

In the description of the present disclosure, unless otherwise explicitly defined, the words such as "arrange", "mount" and "connect" should be understood in a broad sense, and those skilled in the art can reasonably determine the specific meanings of the above words in the present disclosure with reference to the specific contents of the technical solutions.

Referring to FIGS. 1 to 9, a preferred embodiment of a light bulb in the present disclosure includes: an enclosure 1, the enclosure 1 being provided with a connection portion 2, the connection portion 2 being provided with an opening 3, and the opening 3 being in communication with an interior of the enclosure 1; a base 4, the base 4 being connected to the connection portion 2 of the enclosure 1, an inner side surface of the base 4 being provided with a first conductive contact 5, and an inner end of the base 4 away from the enclosure 1 being provided with a second conductive contact 6; a light-emitting body 7, the light-emitting body 7 including an alternating current filament 8, a first resistor 9, and a second resistor 10, the alternating current filament 8 being configured to emit light, and the alternating current filament 8 being located in the enclosure 1; and a plug 11, the plug 11 being arranged at the opening 3, the plug 11 being configured to block the opening 3, and the plug 11 including a first end surface 12 close to the alternating current filament 8 and a second end surface 13 away from the alternating current filament 8. The first resistor 9 includes a first body 14, and a first wire 15 and a first pin 16 respectively connected to two ends of the first body 14. The second resistor 10 includes a second body 17, and a second wire 18 and a second pin 19 respectively connected to two ends of the second body 17. The first body 14 and the second body 17 are arranged in the plug 11, and the first wire 15 and the second wire 18 pass through the first end surface 12 and are respectively connected to two ends of the alternating current filament 8. The first wire 15 and the second wire 18 pass through the second end surface 13 and are respectively in contact with the first conductive contact 5 and the second conductive contact 6. The plug 11 is provided with a first slot 20. The first slot 20 extends through the second end surface 13, and the first body 14 is tightly fitted in the first slot 20, to limit displacement of the first body 14 and facilitate bending of the first pin 16 during processing such that the first pin 16 is in contact with the first conductive contact 5.

In the light bulb of the present disclosure, since the plug 11 is provided with the first slot 20, and the first body 14 is tightly fitted in the first slot 20, to limit displacement of the first body 14 and facilitate bending of the first pin 16 during processing, the first pin 16 is bent at a more accurate angle such that the first pin 16 is in contact with the first conductive contact 5. Not only can the manufacturing efficiency of the light bulb be improved, but the production yield of the light bulb can also be improved.

In a preferred embodiment of the present disclosure, the following additional technical features may be further provided.

Figure 3:
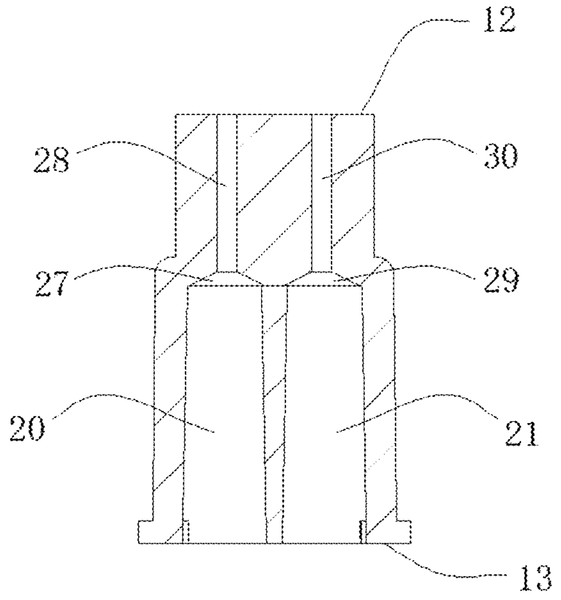
FIG. 3 is a schematic structural diagram of a plug according to an embodiment of the present disclosure.
Figure 5:
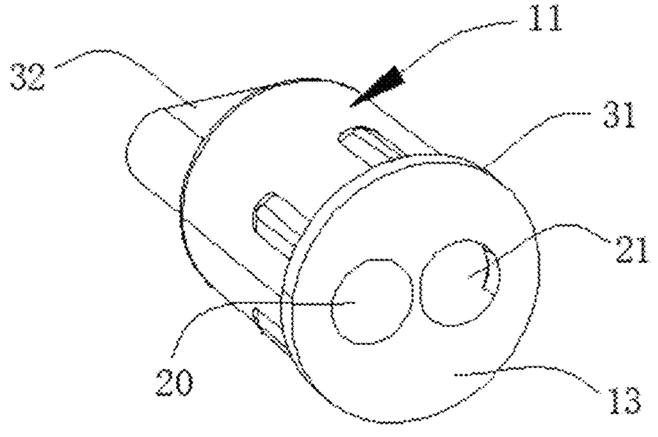
FIG. 5 is a perspective view of a plug according to an embodiment of the present disclosure from another perspective.
Figure 6:
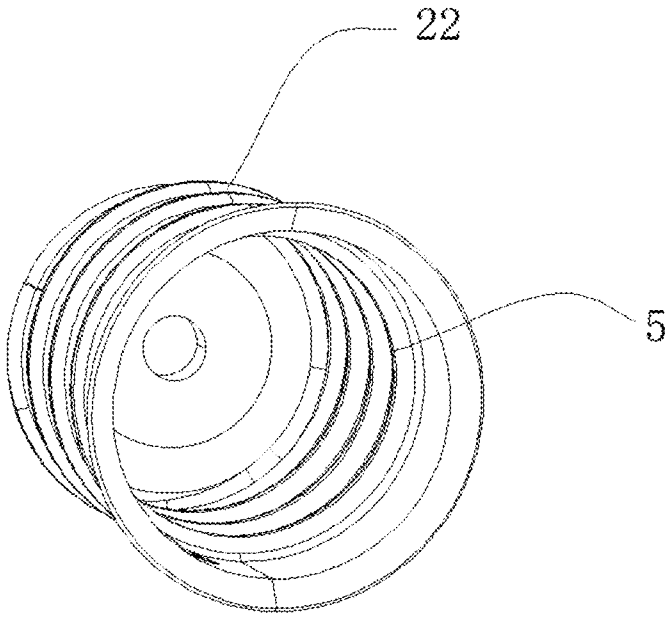
FIG. 6 is a perspective view of a housing of a base according to an embodiment of the present disclosure.

With reference to FIGS. 1, 3 and 5, in an implementation, the plug 11 is provided with a second slot 21. The second slot 21 extends through the second end surface 13, and the second body 17 is tightly fitted in the second slot 21, to limit displacement of the second body 17 and facilitate bending of the second pin 19 during processing such that the second pin 19 is in contact with the second conductive contact 6. Not only can the manufacturing efficiency of the light bulb be further improved, but the production yield of the light bulb can also be further improved. In other implementations, the plug 11 may not be provided with the second slot 21.

Figure 7:
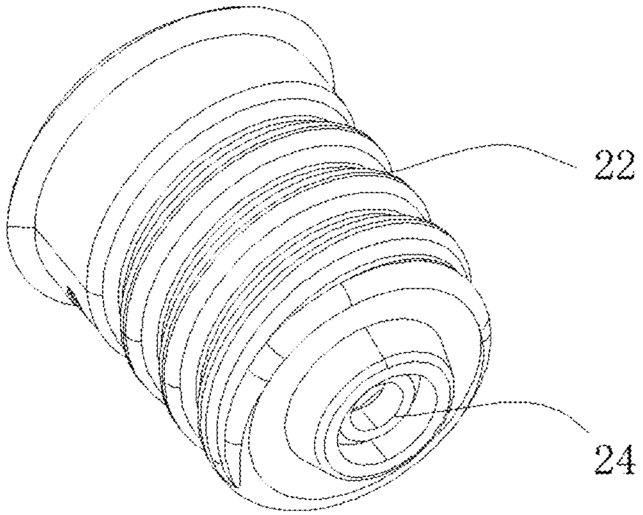
FIG. 7 is a perspective view of a housing of a base according to an embodiment of the present disclosure from another perspective.
Figure 8:
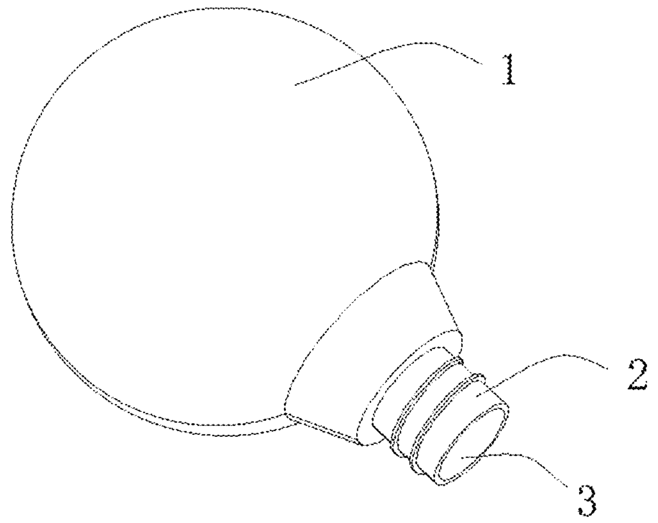
FIG. 8 is a perspective view of an enclosure according to an embodiment of the present disclosure.
Figure 9:
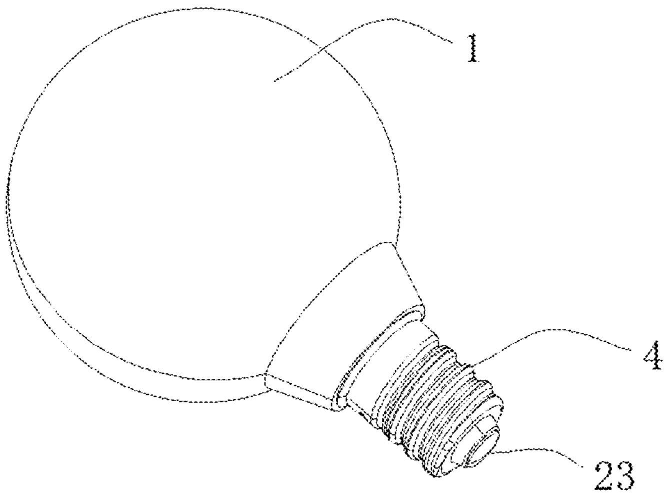
FIG. 9 is a perspective view of a light bulb according to an embodiment of the present disclosure.

Referring to FIGS. 7 and 9, in an implementation, the base 4 includes a housing 22 and a rivet 23. A bottom of the housing 22 is provided with a mounting hole 24. The mounting hole 24 extends through the bottom of the housing 22, the rivet 23 is arranged on the mounting hole 24, the second conductive contact 6 is located on the rivet 23, and the second wire 18 is riveted to the second conductive contact 6. The contact between the second wire 18 and the second conductive contact 6 is more reliable, reducing the occurrence of poor contact. In other implementations, the second wire 18 and the second conductive contact 6 may be connected to each other by means of other suitable structures.

Figure 4:
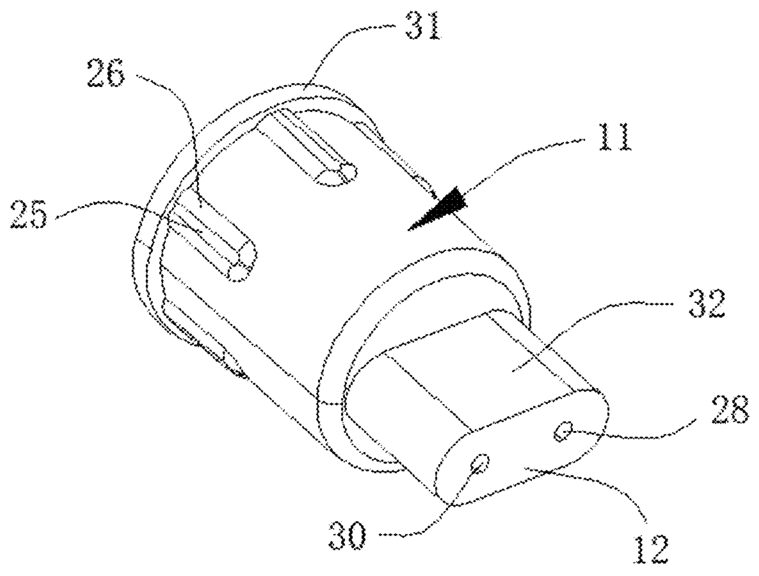
FIG. 4 is a perspective view of a plug according to an embodiment of the present disclosure.

Referring to FIG. 4, in an implementation, an outer side surface of the plug 11 is provided with a protrusion 25. The protrusion 25 is configured to increase the friction between the plug 11 and the opening 3 to make the connection between the plug 11 and the opening 3 more stable, so that the plug 11 can be prevented from loosening in the opening 3, reducing the occurrence of damage to the light bulb. In other implementations, the outer side surface of the plug 11 may be not provide with the protrusion 25.

In an implementation, there are a plurality of protrusions 25. The protrusions 25 are provided around the plug 11, and the protrusions 25 are provided at an end of the plug 11 close to the second end surface 13, so that the plug 11 can be further prevented from loosening in the opening 3, further reducing the occurrence of damage to the light bulb. In addition, the plugging of the plug 11 into the opening 3 can be facilitated by providing the protrusions 25 at the end of the plug 11 close to the second end surface 13. In other implementations, the protrusions 25 may be provided at other suitable positions on the plug 11.

In an implementation, an edge of the protrusion 25 is configured as a curved surface 26, so that scratching of an inner wall of the opening 3 by the edge of the protrusion 25 can be reduced. In other implementations, the edge of the protrusion 25 may be configured in a corner shape, or the edge of the protrusion 25 may be configured in other suitable shapes, and is not limited thereto.

Referring to FIGS. 1 and 3, in an implementation, the first slot 20 is provided with a first guide surface 27 at an end close to the first end surface 12. The first guide surface 27 is of a size that gradually decreases in a direction from the second end surface 13 to the first end surface 12, the plug 11 is provided with a first channel 28, two ends of the first channel 28 respectively extend through the first end surface 12 and the center of the first guide surface 27, and the first wire 15 extends out of the first end surface 12 through the first channel 28. During assembly of the light bulb, it is necessary to insert the first wire 15 into the first channel 28. When the first wire 15 is aligned with the first channel 28, the first wire 15 can be inserted into the first channel 28 by continuously applying a pushing force to the first wire 15. When the first wire 15 is not aligned with the first channel 28, due to the provision of the first guide surface 27, by continuously applying the pushing force to the first wire 15, the first wire 15 can move along the first guide surface 27 to the first channel 28, and the first wire 15 can also pass through the first channel 28, improving the assembly efficiency of the light bulb.

In an implementation, the second slot 21 is provided with a second guide surface 29 at an end close to the second end surface 13. The second guide surface 29 is of a size that gradually decreases in a direction from the second end surface 13 to the second end surface 13, the plug 11 is provided with a second channel 30, two ends of the second channel 30 respectively extend through the second end surface 13 and the center of the second guide surface 29, and the second wire 18 extends out of the second end surface 13 through the second channel 30. In this way, during assembly of the light bulb, it is necessary to insert the second wire 18 into the second channel 30. When the second wire 18 is aligned with the second channel 30, the second wire 18 can be inserted into the second channel 30 by continuously applying a pushing force to the second wire 18. When the second wire 18 is not aligned with the second channel 30, due to the provision of the second guide surface 29, by continuously applying the pushing force to the second wire 18, the second wire 18 can move along the second guide surface 29 to the second channel 30, and the second wire 18 can also pass through the second channel 30, improving the assembly efficiency of the light bulb.

Referring to FIG. 5, in an implementation, the plug 11 includes a limiting portion 31. The limiting portion 31 is provided at an end of the plug 11 away from the first end surface 12, the second end surface 13 is located on the limiting portion 31, the width of the limiting portion 31 is greater than the width of the opening 3, the limiting portion 31 is located outside the opening 3 after the plug 11 is mounted to the opening 3, and the limiting portion 31 is configured to limit the plug 11 from being fully plugged into the opening 3, making the mounting process of the plug 11 easier and preventing the plug 11 from being fully plugged into the opening 3. In other implementations, the plug 11 may include no limiting portion 31.

Referring to FIG. 4, in an implementation, the plug 11 includes an extension portion 32. The extension portion 32 is provided at an end of the plug 11 away from the second end surface 13, the first end surface 12 is located on the extension portion 32, the extension portion 32 is located in the enclosure 1 after the plug 11 is mounted in the opening 3, and the extension portion 32 is configured to enhance support for the first wire 15 and the second wire 18, so that the first wire 15 and the second wire 18 are more stable. In other implementations, the plug 11 may include no extension portion 32.

Those skilled in the art can freely combine and use the above additional technical features provided that no conflict occurs.

The foregoing implementations are only preferred implementations of the present disclosure and cannot be used to limit the scope of protection of the present disclosure. All non-essential modifications and substitutions made by those skilled in the art on the basis of the present disclosure shall fall within the scope of protection of the present disclosure.

The invention claimed is:

1. A light bulb, comprising:

an enclosure provided with a connection portion, the connection portion being provided with an opening in communication with an interior of the enclosure;

a base connected to the connection portion of the enclosure, an inner side surface of the base being provided with a first conductive contact, and an inner end of the base away from the enclosure being provided with a second conductive contact;

a light-emitting body comprising an alternating current filament, a first resistor, and a second resistor, the alternating current filament being configured to emit light and located in the enclosure; and a plug arranged at the opening, the plug being configured to block the opening, and comprising a first end surface close to the alternating current filament and a second end surface away from the alternating current filament, wherein the first resistor comprises a first body, and a first wire and a first pin respectively connected to two ends of the first body; the second resistor comprises a second body, and a second wire and a second pin respectively connected to two ends of the second body; the first body and the second body are arranged in the plug, and the first wire and the second wire pass through the first end surface and are respectively connected to two ends of the alternating current filament; the first wire and the second wire pass through the second end surface and are respectively in contact with the first conductive contact and the second conductive contact; wherein a first groove is located inside the plug, and shape of the first groove is elongated, and length direction of the first groove is consistent with direction from the first end surface to the second end surface, the first groove extends through the second end surface, and the first body is tightly fitted in the first groove, to limit displacement of the first body and facilitate bending of the first pin during processing such that the first pin is in contact with the first conductive contact; a first channel is located inside the plug, and shape of the first channel is elongated, and length direction of the first channel is consistent with direction from the second end surface to the first end surface; one end of the first channel runs through the first end surface, and the other end of the first channel is connected to the first groove; the first wire extends out of the first end surface through the first channel.

2. The light bulb according to claim 1, wherein a second groove is located inside the plug, and the shape of the second groove is elongated, and the length direction of the second groove is consistent with the direction from the first end surface to the second end surface, the second groove extends through the second end surface, and the second body is tightly fitted in the second groove, to limit displacement of the second body and facilitate bending of the second pin during processing such that the second pin is in contact with the second conductive contact; a second channel is located inside the plug, and shape of the second channel is elongated, and length direction of the second channel is consistent with direction from the second end surface to the first end surface, one end of the second channel runs through the first end surface, and the other end of the second channel is connected to the second groove; the first wire extends out of the first end surface through the first channel, and the second wire extends out of the second end surface through the second channel.

3. The light bulb according to claim 2, wherein the base comprises a housing and a rivet, a bottom of the housing being provided with a mounting hole, the mounting hole extending through the bottom of the housing, the rivet being arranged on the mounting hole, the second conductive contact is located on the rivet, and the second wire is riveted to the second conductive contact.

4. The light bulb according to claim 3, wherein the plug comprises an extension portion provided at an end of the plug away from the second end surface, the first end surface being located on the extension portion, the extension portion is located in the enclosure after the plug is mounted in the opening, and the extension portion is configured to enhance support for the first wire and the second wire.

5. The light bulb according to claim 1, wherein an outer side surface of the plug is provided with a protrusion configured to increase the friction between the plug and the opening to make the connection between the plug and the opening more stable.

6. The light bulb according to claim 5, wherein there are a plurality of protrusions provided around the plug, the protrusions being provided at an end of the plug close to the second end surface.

7. The light bulb according to claim 5, wherein an edge of the protrusion is configured as a curved surface.

8. The light bulb according to claim 1, wherein the plug comprises a limiting portion provided at an end of the plug away from the first end surface, the second end surface being located on the limiting portion, the width of the limiting portion being greater than the width of the opening, the limiting portion is located outside the opening after the plug is mounted to the opening, and the limiting portion is configured to limit the plug from being fully plugged into the opening.

* * * * *